US009332375B2

(12) United States Patent
Ishida

(10) Patent No.: US 9,332,375 B2
(45) Date of Patent: May 3, 2016

(54) IMAGE FORMING APPARATUS, PRINTING SYSTEM, AND ELECTRONIC DEVICE

(71) Applicant: KYOCERA Document Solutions Inc., Osaka (JP)

(72) Inventor: Takayuki Ishida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/079,366

(22) Filed: Nov. 13, 2013

(65) Prior Publication Data

US 2014/0139873 A1  May 22, 2014

(30) Foreign Application Priority Data

Nov. 16, 2012  (JP) .................................. 2012-252766

(51) Int. Cl.
*G06F 15/00* (2006.01)
*H04W 4/00* (2009.01)

(52) U.S. Cl.
CPC ..................................... *H04W 4/008* (2013.01)

(58) Field of Classification Search
CPC ..................................................... H04W 4/008
USPC ........................................................ 358/1.15
See application file for complete search history.

(56) References Cited

U.S. PATENT DOCUMENTS

| 7,894,383 | B2* | 2/2011 | Ikeda ....................... H04L 45/00 370/328 |
| 2007/0232357 | A1* | 10/2007 | Takasu .......................... 455/558 |
| 2009/0033984 | A1* | 2/2009 | Sahashi ......................... 358/1.15 |
| 2010/0014118 | A1* | 1/2010 | Yamano ............. H04N 1/00278 358/1.15 |
| 2010/0056199 | A1* | 3/2010 | Chen ..................... H04W 52/08 455/550.1 |
| 2010/0190449 | A1* | 7/2010 | Suzuki ........................ 455/67.11 |
| 2011/0026068 | A1 | 2/2011 | Yoshida |

FOREIGN PATENT DOCUMENTS

| CN | 102077576 A | 5/2011 |
| JP | 2008-072487 | 3/2008 |
| JP | 2008-085792 | 4/2008 |
| JP | 2009-038606 | 2/2009 |
| JP | 2009-117969 | 5/2009 |

OTHER PUBLICATIONS

Office Action mailed by SIPO on Nov. 26, 2015 in the corresponding Chinese patent application No. 201310556858.1—9 pages.

* cited by examiner

*Primary Examiner* — Tammy Pham
*Assistant Examiner* — Mark Milia
(74) *Attorney, Agent, or Firm* — Knobbe, Martens, Olson & Bear, LLP

(57) ABSTRACT

An image forming apparatus includes a communication unit, a radio wave intensity measurement unit, and a communication control unit. The radio wave intensity measurement unit measures a radio wave intensity of radio waves received by the communication unit. The communication control unit performs control associated with communication disruption between the portable terminal and the communication unit when the measured result is lower than a predetermined first radio wave intensity and continuously decreases for a predetermined reference time.

5 Claims, 5 Drawing Sheets

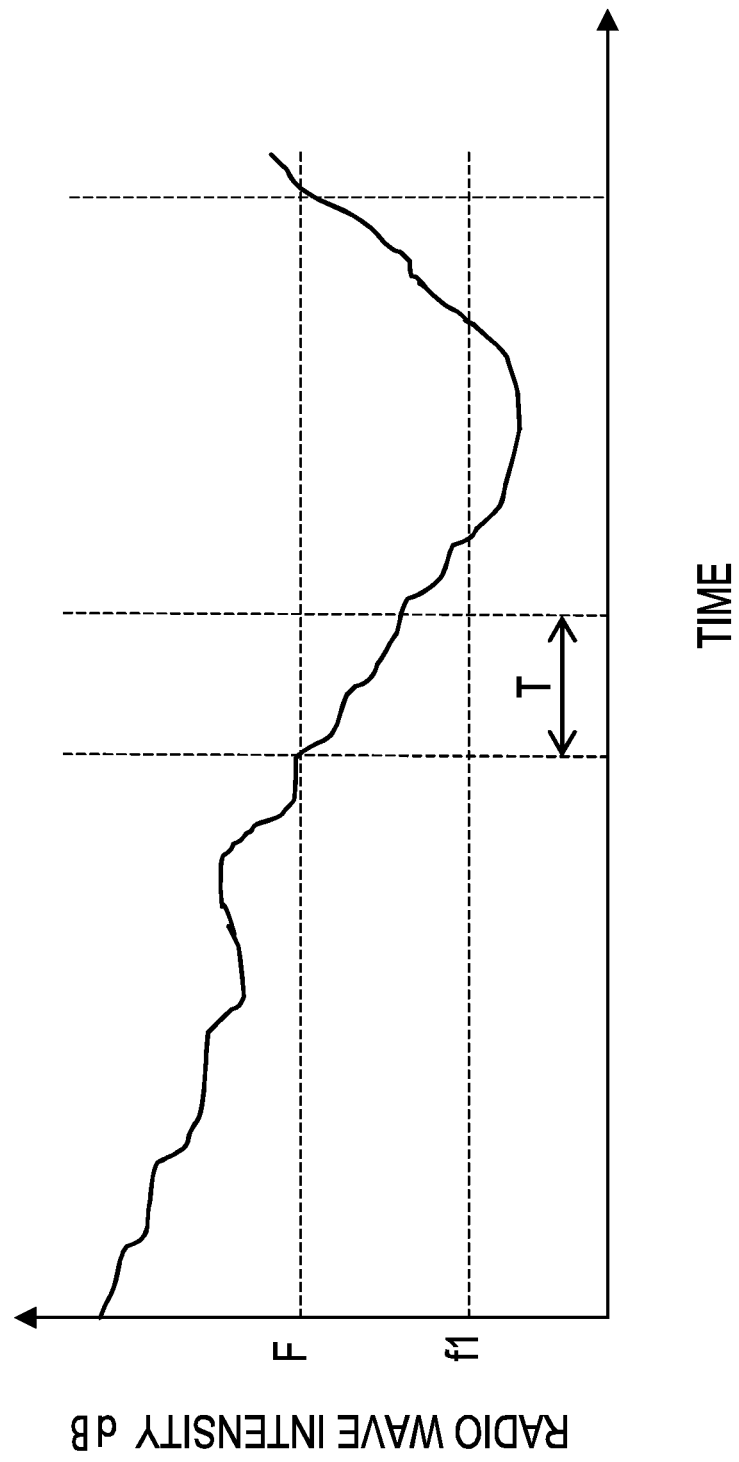

IMAGE FORMING APPARATUS, PRINTING SYSTEM, AND ELECTRONIC DEVICE

INCORPORATION BY REFERENCE

This application claims priority to Japanese Patent Application No. 2012-252766 filed on Nov. 16, 2012, the entire contents of which are incorporated by reference herein.

BACKGROUND

The present disclosure relates to an image forming apparatus, an electronic device, and a printing system equipped with a portable terminal capable of performing wireless communication with an electronic device.

Printing systems, in which printing data is transmitted using wireless communication (a wireless local area network (LAN) such as wireless fidelity (Wi-Fi)) from a portable terminal such as a laptop personal computer (PC) or a tablet PC, and an image forming apparatus such as a printer receives the printing data to carry out printing, are in wide use. According to such printing systems, since it is not necessary to connect the portable terminal and the printer using a cable, the printing can be carried out rapidly and simply.

However, while the portable terminal transmits the printing data, when a distance between the portable terminal and the printer is increased due to portability, a sufficient communication speed cannot be maintained, and the communication speed drops, which increases a time taken for a transmission job to be terminated.

Therefore, for the purpose of securing quality of communication, technology for dynamically controlling radio wave intensity to secure the communication quality at a constant level is proposed. Further, technology for setting a directivity direction of a directional antenna receiving radio waves based on the radio wave intensity is also proposed.

Further, technology in which the portable terminal changes a method of compressing transmission data depending on the communication speed to reduce a size of the data, and thereby the transmission job is rapidly terminated even in the environment in which radio wave situations are bad is proposed. Further, technology for securing the communication quality by finding a proper link from a plurality of access points depending on the radio wave intensity of the portable terminal is also proposed.

SUMMARY

Technology that further improves the aforementioned technologies is proposed as one aspect of the present disclosure.

An image forming apparatus according to one aspect of the present disclosure includes a communication unit, a radio wave intensity measurement unit, and a communication control unit.

The communication unit performs wireless communication with a portable terminal.

The radio wave intensity measurement unit measures an intensity of radio waves received by the communication unit.

The communication control unit performs control associated with communication disruption between the portable terminal and the communication unit when a measured result by the radio wave intensity measurement unit is lower than a predetermined first radio wave intensity and continuously decreases for a predetermined reference time.

Further, a printing system according to another aspect of the present disclosure includes a portable terminal and an image forming apparatus performing wireless communication with the portable terminal.

The portable terminal includes a terminal-side communication unit and a terminal-side communication control unit.

The terminal-side communication unit performs the wireless communication with the image forming apparatus.

The terminal-side communication control unit performs control associated with the wireless communication.

The image forming apparatus includes an apparatus-side communication unit, a radio wave intensity measurement unit, an image forming unit, and an apparatus-side communication control unit.

The apparatus-side communication unit performs the wireless communication with the portable terminal.

The radio wave intensity measurement unit measures a radio wave intensity of radio waves received by the apparatus-side communication unit.

The image forming unit forms an image on recording paper based on data received by the apparatus-side communication unit.

The apparatus-side communication control unit performs control associated with the wireless communication.

The terminal-side communication control unit and the apparatus-side communication control unit perform control associated with communication disruption between the terminal-side communication unit and the apparatus-side communication unit when the measured result of the radio wave intensity measured by the radio wave intensity measurement unit is lower than a predetermined first radio wave intensity and continuously decreases for a predetermined reference time.

An electronic device according to yet another aspect of the present disclosure includes the communication unit, the radio wave intensity measurement unit, and the communication control unit.

BRIEF DESCRIPTION OF THE DRAWINGS

FIG. 5 is a diagram showing an example of a temporal change in the radio wave intensity.

DETAILED DESCRIPTION

Hereinafter, an electronic device and a printing system according to an embodiment of the present disclosure will be described with reference to the drawings.

Figure 1:
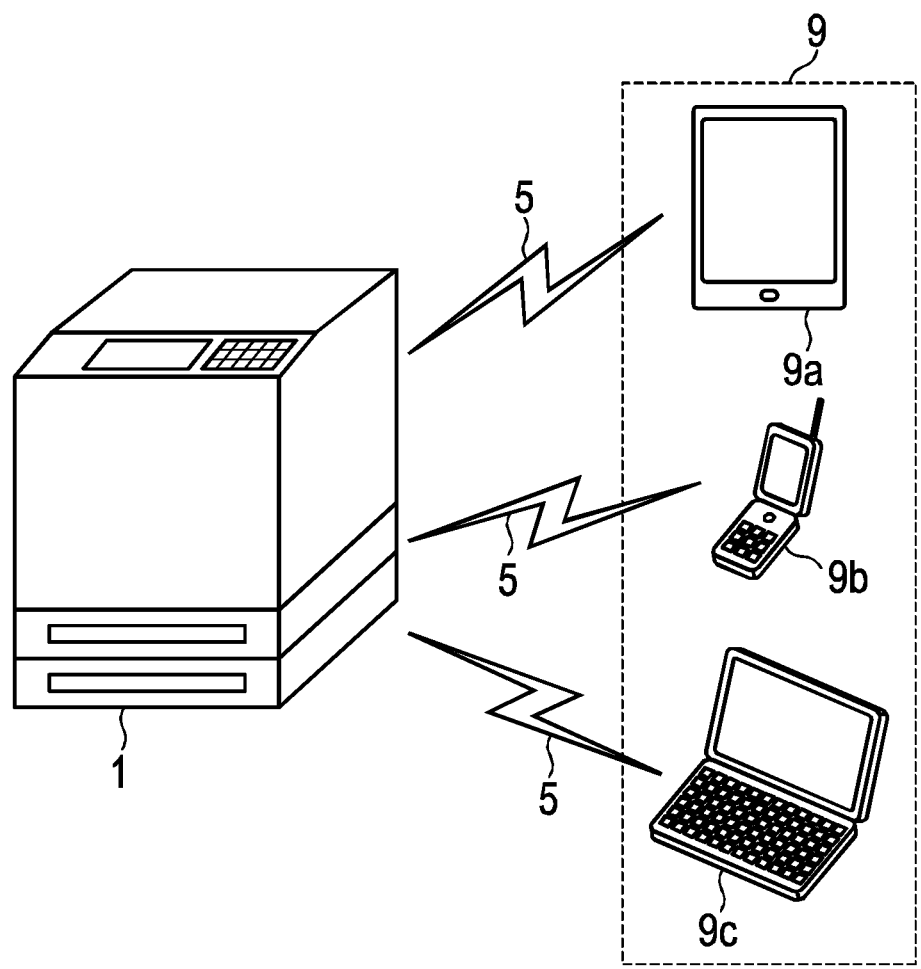
FIG. 1 is a diagram showing a constitution of a printing system according to an embodiment of the present disclosure.

FIG. 1 is a diagram showing a constitution of a printing system according to an embodiment of the present disclosure. The printing system in the present embodiment is constituted of a portable terminal 9 serving as a host terminal transmitting printing data, and an image forming apparatus 1 that receives the printing data from the portable terminal 9 and carries out a print job. The image forming apparatus 1 is an example of the electronic device according to the embodiment of the present disclosure.

The image forming apparatus 1 and the portable terminal 9 are directly connected one to one by a wireless local area network (LAN) 5 such as wireless fidelity (Wi-Fi). The image forming apparatus 1 is, for example, a multifunction machine having a plurality of functions such as a copy function, a printer function, a scanner function, and a facsimile function, or an apparatus having a stand-alone function, such as a printer or a facsimile machine. The portable terminal 9 includes a tablet computer 9a, a mobile phone 9b, or a laptop computer 9c, and is an electronic device that can transmit the printing data to the image forming apparatus 1 via the wireless LAN 5.

Figure 2:
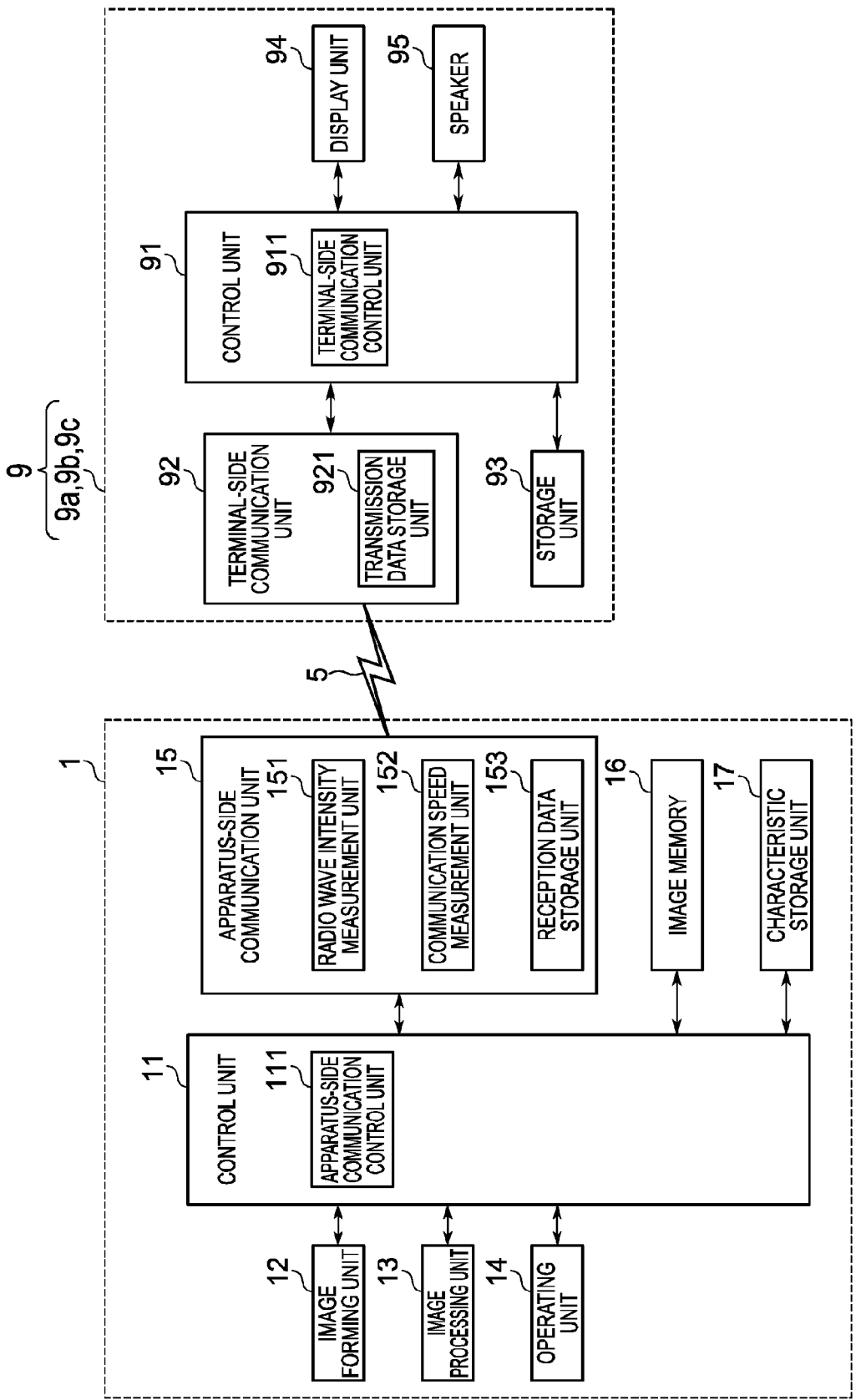
FIG. 2 is a block diagram showing constitutions of an image forming apparatus and a portable terminal.

FIG. 2 is a block diagram showing constitutions of the image forming apparatus 1 and the portable terminal 9 in the present embodiment. The image forming apparatus 1 includes a control unit 11, an image forming unit 12, an image processing unit 13, an operating unit 14, an apparatus-side communication unit 15, an image memory 16, and a characteristic storage unit 17.

The image forming unit 12 forms an image based on image data on recording paper as a recording medium. The image processing unit 13 conducts image processing, such as magnifying/reducing, on the image data. The operating unit 14 receives an instruction from an operator with respect to various operations and processes which the image forming apparatus 1 can conduct, and is made up of a touch panel or operation keys.

The apparatus-side communication unit 15 is constituted of a communication circuit having an antenna and a transceiver circuit for performing wireless communication with the portable terminal 9 connected to the wireless LAN 5. Further, the apparatus-side communication unit 15 stores a media access control (MAC) address allocated to each mobile phone 9 in an internal memory (not shown), and performs the wireless communication with the portable terminal 9 corresponding to the MAC address.

The apparatus-side communication unit 15 includes a radio wave intensity measurement unit 151, a communication speed measurement unit 152, and a reception data storage unit 153. The radio wave intensity measurement unit 151 measures an intensity of radio waves transmitted from the portable terminal 9. The communication speed measurement unit 152 measures a communication speed of the radio waves transmitted from the portable terminal 9. The reception data storage unit 153 temporarily stores data transmitted from the portable terminal 9.

The image memory 16 stores the image data processed by the image processing unit 13. Further, when communication disruption between the apparatus-side communication unit 15 and the portable terminal 9 is predicted, stored contents of the reception data storage unit 153 are transferred to and stored in the image memory 16 by an apparatus-side communication control unit 111 to be described below. Details of this processing will be described below.

The characteristic storage unit 17 stores a relation between the radio wave intensity measured by the radio wave intensity measurement unit 151 and the communication speed measured by the communication speed measurement unit 152. Further, the characteristic storage unit 17 pre-stores reference characteristics showing a relation between a radio wave intensity and a communication speed before factory shipment of the image forming apparatus 1. The reference characteristics are characteristics that have been measured under an environment in which no communication failure occurs before the factory shipment of the image forming apparatus 1.

The control unit 11 is made up of a central processing unit (CPU), reads out a variety of programs to carry out the processes, and performs output of instruction signals and data transmission to respective functional units to collectively control the image forming apparatus 1. The control unit 11 has an apparatus-side communication control unit 111.

The apparatus-side communication control unit 111 retrieves measured results from the radio wave intensity measurement unit 151 and the communication speed measurement unit 152, and stores the measured results in the characteristic storage unit 17 as current communication characteristics (hereinafter referred to as "current characteristics"). Furthermore, when the measured result of the radio wave intensity measurement unit 151 is lower than a predetermined radio wave intensity and continues to decrease for a predetermined time, the apparatus-side communication control unit 111 performs control providing for the communication disruption. Further, when the current characteristics are worse than the reference characteristics, the apparatus-side communication control unit 111 changes a reference radio wave characteristic F to be described below. The control providing for the communication disruption and the process of changing the reference radio wave characteristic F will be described below in detail.

The portable terminal 9 includes the control unit 91, a terminal-side communication unit 92, a storage unit 93, a display unit 94, and a speaker 95. The terminal-side communication unit 92 is constituted of an antenna and a transceiver circuit for performing wireless communication with the image forming apparatus 1 connected to the wireless LAN 5. Further, the terminal-side communication unit 92 has a transmission data storage unit 921 that stores the printing data transmitted to the image forming apparatus 1.

The storage unit 93 stores programs and data for implementing various functions provided for the mobile phone 9. The display unit 94 is made up of a liquid crystal display (LCD) or an electronic luminescent display (ELD), and displays various operations, operation contents, and messages under the control of the control unit 91. The speaker 95 outputs a voice and a warning sound under the control of the control unit 91. The display unit 94 and the speaker 95 are an example of a notification unit in the present disclosure.

The control unit 91 is made up of a CPU, reads out various programs to carry out the processes, and performs output of instruction signals and data transmission to respective functional units to collectively control the mobile phone 9. The control unit 91 has a terminal-side communication control unit 911. When receiving a message warning about the communication disruption from the image forming apparatus 1, the terminal-side communication control unit 911 stores the contents of the transmission data storage unit 921 and progress information of a transmission job in the storage unit 93.

Figure 3:
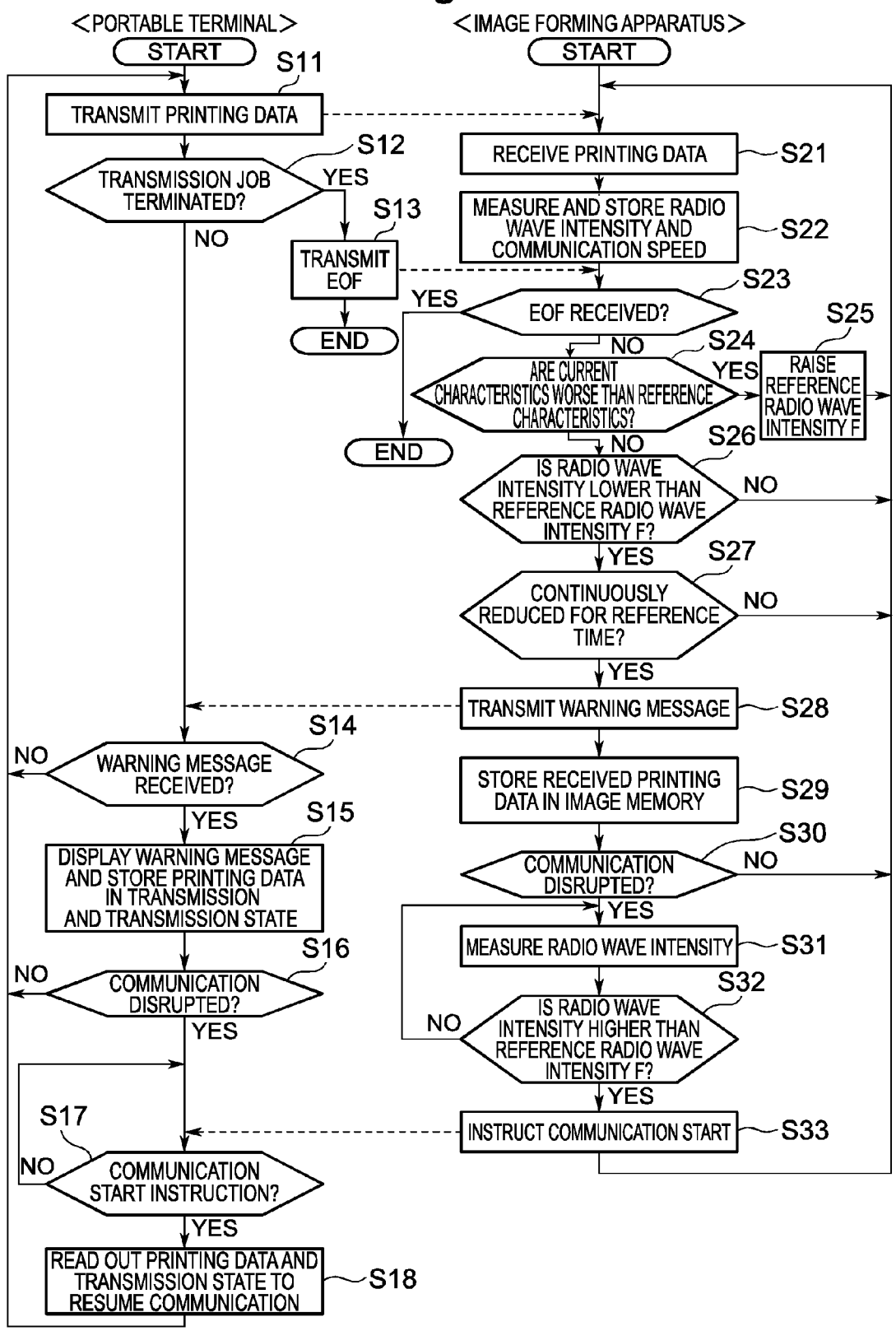
FIG. 3 is a flow chart showing a flow of communication processing between the image forming apparatus and the portable terminal.

FIG. 3 is a flow chart showing a flow of communication processing between the image forming apparatus 1 and the portable terminal 9 in the present embodiment. When the portable terminal 9 is instructed to start the transmission of printing data by an operation of a user, the terminal-side communication control unit 911 stores the printing data in the transmission data storage unit 921, and the terminal-side communication unit 92 transmits the printing data stored in the transmission data storage unit 921 through wireless communication (step S11). The apparatus-side communication unit 15 of the image forming apparatus 1 receives the printing data from the portable terminal 9, and the reception data storage unit 153 stores the printing data (step S21).

While receiving the printing data from the portable terminal 9, at given intervals (e.g., every 15 seconds), the radio wave intensity measurement unit 151 measures a radio wave intensity, and the communication speed measurement unit 152 measures a communication speed. The characteristic storage unit 17 stores the measured results (step S22).

When the terminal-side communication unit 92 transmits all the printing data (YES in step S12), the terminal-side communication unit 92 transmits a signal denoting an end-of-data (called an end-of-file (EOF)) (step S13), and the terminal-side communication control unit 911 completes the communication processing with the image forming apparatus 1. When the apparatus-side communication unit 15 receives the EOF (YES in step S23), the apparatus-side communication control unit 111 completes the communication processing with the portable terminal 9.

Subsequently, the control unit 11 compares the current characteristics and the reference characteristics that are stored in the characteristic storage unit 17 (step S24). The comparison between the current characteristics and the reference characteristics will be described using FIG. 4.

Figure 4:
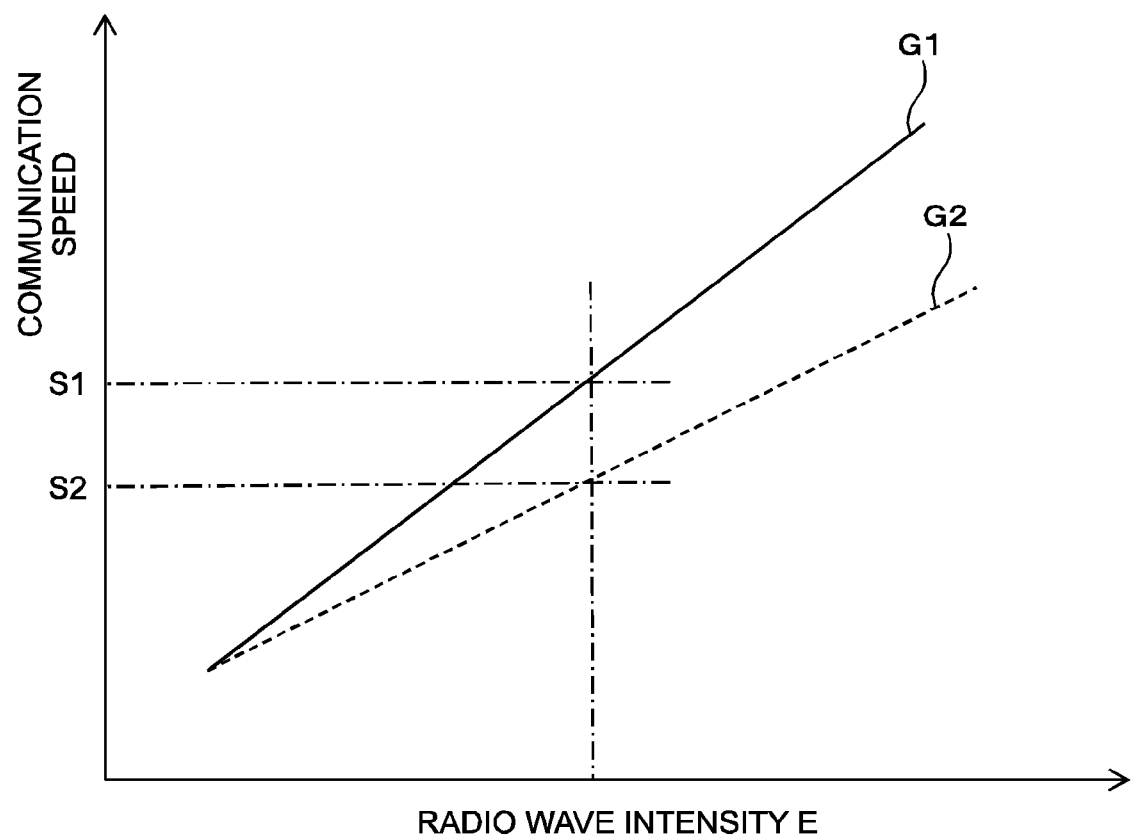
FIG. 4 is a graph showing an example of a relation between a radio wave intensity and a communication speed.

FIG. 4 is a graph showing an example of the relation between the radio wave intensity and the communication speed. A solid line graph G1 denotes the reference characteristics measured under the environment in which there is no communication failure before the factory shipment of the image forming apparatus 1, and a graph G2 denotes an example of the current characteristics. The reference characteristics are pre-stored in the characteristic storage unit 17.

For example, when a wall formed of a metal is installed around the image forming apparatus 1, the radio waves radiated from the terminal-side communication unit 92 may be reflected by the wall. If there are many components of the reflected waves, even when the radio wave intensity is high, the communication speed may not be secured. In other words, as shown in the graphs G1 and G2, even when the radio waves received by the apparatus-side communication unit 15 have the same radio wave intensity E, the communication speed is S1 in the event of the factory shipment, but the communication speed may decrease to S2 under the environment in which communication failure such as reflection occurs.

Therefore, when the current characteristics are worse (lower) than the reference characteristics (YES in step S24), the apparatus-side communication control unit 111 raises the reference radio wave intensity F used when determining a possibility of the communication disruption by a predetermined value (step S25). The reference radio wave intensity (first radio wave intensity) F is a lower limit radio wave intensity at which the communication speed sufficient to avoid causing a user stress can be secured, and is a preset value.

As a method of comparing the current characteristics and the reference characteristics, for example, the apparatus-side communication control unit 111 may derive the communication speeds (e.g., S1 and S2 of FIG. 4) at the radio wave intensity (e.g., the radio wave intensity E of FIG. 4) predetermined from the reference characteristics and the current characteristics, and determine that, when the communication speed S2 in the current characteristics is lower than the communication speed S1 in the reference characteristics by a predetermined value, the current characteristics become worse.

On the other hand, when the current characteristics are not worse (lower) than the reference characteristics (NO in step S24), and the radio wave intensity measured by the radio wave intensity measurement unit 151 is lower than the predetermined reference radio wave intensity F (YES in step S26) and continues to decrease for a reference time (YES in step S27), the apparatus-side communication control unit 111 causes the apparatus-side communication unit 15 to transmit a warning message warning of the communication disruption to the portable terminal 9 (step S28).

FIG. 5 is a diagram showing an example of a temporal change in radio wave intensity. The reference radio wave intensity F is a lower limit radio wave intensity at which the communication speed sufficient to avoid causing a user stress can be secured, and is a preset value. A radio wave intensity f1 (second radio wave intensity) is a level at which the communication is disrupted. When the radio wave intensity during communication is lower than the reference radio wave intensity F, and continuously decreases, for instance, for the reference time (time T), the communication disruption is predicted. Therefore, before the communication is disrupted, the apparatus-side communication control unit 111 causes the apparatus-side communication unit 15 to transmit a warning message to the portable terminal 9.

Furthermore, the apparatus-side communication control unit 111 directs the printing data stored in the reception data storage unit 153 to the image memory 16, and stores the directed printing data in the image memory 16 (step S29). Further, when the terminal-side communication unit 92 receives the warning message from the apparatus-side communication unit 15 (YES in step S14), the control unit 91 displays the warning message informing a user of the communication disruption on the display unit 94 (step S15). Otherwise, the control unit 91 outputs the warning message informing of the communication disruption from the speaker 95.

Furthermore, the terminal-side communication control unit 911 directs the printing data stored in the transmission data storage unit 921 to the storage unit 93, stores the directed printing data in the storage unit 93, and simultaneously stores a progress state of a transmission job in the storage unit 93 (step S15). The progress state of the transmission job is information that denotes how far the printing data is transmitted, and is an address pointer that shows a current transmission position.

In steps S24 and S25 above, description has been made of the processing in which, when the current characteristics are worse (lower) than the reference characteristics, the apparatus-side communication control unit 111 raises the reference radio wave intensity F by the predetermined value. The reference radio wave intensity F is a reference by which it is determined whether or not the apparatus-side communication control unit 111 transmits the warning message to the portable terminal 9. Depending on the communication environment, even when a signal has the radio wave intensity of the same reference radio wave intensity F, the communication speed varies. Accordingly, although the reference radio wave intensity F is set as the lower limit radio wave intensity at which the communication speed sufficient to avoid causing the user stress can be secured, there are situations in which the reference radio wave intensity F can only be secured at a communication speed that will cause stress depending on the communication environment.

Therefore, when the current characteristics are lower than the reference characteristics, i.e. under an environment in which the communication failure occurs easily, the reference radio wave intensity F is highly changed in step S25, and thereby the determination criterion (warning criterion) by which the apparatus-side communication control unit 111 transmits the warning message is raised. In this way, the reference radio wave intensity F is corrected according to the communication environment. Thereby, even under the environment in which the communication failure occurs easily, a warning can be notified of before the communication speed becomes a speed that causes a user stress while an adequate communication state is secured.

In a method of changing the reference radio wave intensity F in step S25, a predetermined value may be added to the reference radio wave intensity F, or the apparatus-side communication control unit 111 may derive a radio wave intensity at which the communication speed that does not cause a user stress can be secured from the current characteristics, and this radio wave intensity may be updated and set as the reference radio wave intensity F.

Then, when the communication is disrupted, for instance, as the radio wave intensity falls below f1 (YES in step S30, YES in step S16), the radio wave intensity measurement unit 151 measures a radio wave intensity of the radio waves received by the apparatus-side communication unit 15 (step S31), and the apparatus-side communication control unit 111 retrieves the measured result and continues with a process of comparing the measured result with the reference radio wave intensity F (step S32). When the measured result is greater than the reference radio wave intensity F (YES in step S32), the apparatus-side communication control unit 111 causes the apparatus-side communication unit 15 to transmit an instruction signal for starting the communication to the terminal-side communication unit 92 (step S33), and the terminal-side communication control unit 911 transfers the process to step S21. In addition, processing following S11 is repeated in the portable terminal 9 side while the communication is disrupted (NO in step S16).

When the terminal-side communication unit 92 receives the instruction signal for starting the communication from the apparatus-side communication unit 15 (YES in step S17), the terminal-side communication control unit 911 reads the printing data out of the storage unit 93, stores the read printing data in the transmission data storage unit 921, reads out the progress information about the transmission job again, and changes the address pointer to a state before the communication disruption (step S18). By doing so, although the printing data is re-transmitted from the beginning when the communication is disrupted in the course of the transmission job and is again connected in the future, the printing data can be continuously transmitted from a point in time at which the communication disruption is predicted. Then, the apparatus-side control unit 11 transfers the process to step S11.

As described above, when the radio wave intensity transmitted by the terminal-side communication unit 92 is lower than the reference radio wave intensity F and continuously decreases from a reference time, the apparatus-side communication control unit 111 and the terminal-side communication control unit 911 perform various processes associated with the communication disruption. Thereby, the transmission job can be smoothly carried out. In other words, even when the radio wave intensity becomes weak, an adequate communication speed is maintained using the simple constitution and control. Thereby, the transmission job can be smoothly carried out.

To be specific, the apparatus-side communication control unit 111 transmits the warning message to the portable terminal 9, and thereby the user can know that the communication speed of the running transmission job decreases, and deal with the transmission job so that the transmission job is smoothly carried out, for instance, by putting the portable terminal 9 closer to the image forming apparatus 1. In other words, it is possible to prevent the transmission job from being continuously carried out with a slow communication speed, and to prevent a problem in which, for example, the transmission job is frequently retried between the apparatus-side communication unit 15 and the terminal-side communication unit 92 due to the reduced communication speed, and processing loads of both sides are increased.

Further, with the transmission of the warning message, the apparatus-side communication control unit 111 directs the stored contents of the reception data storage unit 153 to the image memory 16, and stores the contents in the image memory 16 (data saving). Furthermore, the terminal-side communication control unit 911 directs the stored contents of the transmission data storage unit 921 and the transmission state at that point in time to the storage unit 93, and stores the contents and the transmission state in the storage unit 93. Thereby, when the communication is disrupted and then is connected again, it is not necessary to re-transmit the printing data from the beginning, and resumption from a point in time at which the warning message was transmitted is possible. Accordingly, even when the communication disruption and the re-connection occur in the course of the transmission job, the transmission job can be smoothly completed. Further, in the image forming apparatus 1, when the apparatus-side communication control unit 111 receives the printing data transmitted from the portable terminal 9 after the re-connection, the reception data storage unit 153 stores such printing data as the printing data following the printing data that has been received and stored before the communication disruption.

Further, when the current characteristics are worse than the reference characteristics, the apparatus-side communication control unit 111 highly changes the reference radio wave intensity F. Thereby, the warning message corresponding to the communication environment can be transmitted.

According to the foregoing, in the event of the communication between the portable terminal 9 and the image forming apparatus 1, problems that (1) a circuit configuration is complicated, (2) it is impossible to deal with a plurality of portable terminals in motion, (3) a complicated constitution is required for both software and hardware for data compression, and furthermore, in the event of high compression, the number of processes is increased, and burdens of both the portable terminal and the image forming apparatus are increased, and (4) the communication cannot be applied when the portable terminal and the image forming apparatus are directly connected one to one can be addressed.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
   a communication unit performing wireless communication with a portable terminal;
   a radio wave intensity measurement unit measuring an intensity of radio waves received by the communication unit;
   a communication control unit that performs, when (1) a first condition that a measured result of the radio wave intensity measured by the radio wave intensity measurement unit is lower than a predetermined first radio wave intensity and (2) a second condition that the measured result has a negative rate of change over time for a predetermined reference time are satisfied, control associated with communication disruption between the portable terminal and the communication unit, the control associated with communication disruption being control under which the communication control unit causes the communication unit to transmit a warning message warning of the communication disruption to the portable terminal;

a communication speed measurement unit measuring a communication speed of the radio waves received by the communication unit;
   a characteristic storage unit storing communication characteristics denoting a relation of the radio wave intensity and the communication speed between the portable terminal and the image forming apparatus using the measured results by the radio wave intensity measurement unit and the communication speed measurement unit;
   a received data storage unit that temporarily stores data transmitted from the portable terminal; and
   an image memory,
wherein the communication control unit is configured to:
further perform the control associated with communication disruption including (1) saving, at the same time as the transmission of the warning message, the data temporarily stored in the received data storage unit in the image memory, and (2) storing, upon receipt of the data transmitted from the portable terminal when the communication is reconnected after the disruption of the communication, the data in the received data storage unit as data following the data received before the transmission of the warning message;
increase the first radio wave intensity by a predetermined value each time the communication characteristics become worse than predetermined reference characteristics, thereby correcting the first wave intensity; and
transmit an instruction signal for starting communication to the portable terminal when the radio wave intensity measured by the radio wave intensity measurement unit becomes higher than the first radio wave intensity after the disruption of the communication.

2. The image forming apparatus according to claim 1, wherein the communication control unit performs the control associated with the communication disruption between the portable terminal and the communication unit when (1) the first condition, (2) the second condition, and (3) a third condition that the measured result is higher than a predetermined second radio wave intensity as a level at which the communication is disrupted are satisfied.

3. The image forming apparatus according to claim 1, wherein the communication control unit performs the control associated with the communication disruption between the portable terminal and the communication unit when the communication characteristics are not worse than predetermined reference characteristics but the measured result by the radio wave intensity measurement unit is lower than the first radio wave intensity and continuously decreases for the reference time.

4. A printing system equipped with a portable terminal and an image forming apparatus performing wireless communication with the portable terminal, in which:
the portable terminal includes:
a notification unit;
   a terminal-side communication unit performing the wireless communication with the image forming apparatus; and
   a terminal-side communication control unit performing control associated with the wireless communication; and
   the image forming apparatus includes:
   an apparatus-side communication unit performing the wireless communication with the portable terminal;
   a radio wave intensity measurement unit measuring a radio wave intensity of radio waves received by the apparatus-side communication unit;
   an image forming unit forming an image on recording paper based on data received by the apparatus-side communication unit; and
   an apparatus-side communication control unit performing control associated with the wireless communication;
   wherein the apparatus-side communication control unit performs, when (1) a first condition that a measured result of the radio wave intensity measured by the radio wave intensity measurement unit is lower than a predetermined first radio wave intensity and (2) a second condition that the measured result has a negative rate of change over time for a predetermined reference time are satisfied, control associated with communication disruption between the terminal-side communication unit and the apparatus-side communication unit, the control associated with communication disruption being control under which the apparatus-side communication control unit causes the apparatus-side communication unit to transmit a warning message warning of the communication disruption to the portable terminal;
the notification unit warns of the communication disruption between the portable terminal and the image forming apparatus when the terminal-side communication unit receives the warning message;
the portable terminal further includes:
a transmission data storage unit that stores printing data to be transmitted to the image forming apparatus; and
a terminal-side storage unit;
the terminal-side communication control unit performs, when the terminal-side communication unit receives the warning message, the control associated with communication disruption including transferring the printing data stored in the transmission data storage unit to the terminal-side storage unit and storing therein the printing data, and storing an address pointer in the terminal-side storage unit, the address pointer being information representing which part of the printing data to be transmitted has been transmitted to the image forming apparatus;
the image forming apparatus further includes:
   a communication speed measurement unit measuring a communication speed of the radio waves received by the apparatus-side communication unit; and
   a characteristic storage unit storing a relation of the radio wave intensity and the communication speed between the portable terminal and the image forming apparatus using the measured results of the radio wave intensity measurement unit and the communication speed measurement unit;
   a received data storage unit that temporarily stores data transmitted from the portable terminal; and
   an image memory;
the apparatus-side communication control unit is configured to: further perform the control associated with communication disruption including (1) saving, at the same time as the transmission of the warning message, the data temporarily stored in the received data storage unit in the image memory, and (2) storing, upon receipt of the data transmitted from the portable terminal when the communication is reconnected after the disruption of the communication, the data in the received data storage unit as data following the data received before the transmission of the warning message;
increase the first radio wave intensity by a predetermined value each time the communication characteristics are become worse than predetermined reference characteristics, thereby correcting the first radio wave intensity; and
transmit an instruction signal for starting communication to the portable terminal when the radio wave intensity measured by the radio wave intensity measurement unit exceeds the first radio wave intensity after the disruption of the communication; and the terminal-side communication control unit is configured to, when the terminal-side communication unit receives the instruction signal for starting communication from the image forming apparatus: read out the printing data from the terminal-side storage unit; transfer the printing data that has been read out to the transmission data storage unit and store therein the printing data; and read out the address pointer from the terminal-side storage unit, thereby resuming the transmission of the printing data to the apparatus-side communication unit, from the time point where the terminal-side communication unit received the warning message.

5. An electronic device comprising:
a communication unit performing wireless communication with a portable terminal;
a radio wave intensity measurement unit measuring a radio wave intensity of radio waves received by the communication unit; and
a communication control unit that performs, when (1) a first condition that a measured result of the radio wave intensity measured by the radio wave intensity measurement unit is lower than a predetermined first radio wave intensity and (2) a second condition that the measured result has a negative rate of change over time for a predetermined reference time are satisfied, control associated with communication disruption between the portable terminal and the communication unit, the control associated with communication disruption being control under which the communication control unit causes the communication unit to transmit a warning message warning of the communication disruption to the portable terminal;
a communication speed measurement unit measuring a communication speed of the radio waves received by the communication unit;
a characteristic storage unit storing communication characteristics denoting a relation of the radio wave intensity and the communication speed between the portable terminal and the image forming apparatus using the measured results by the radio wave intensity measurement unit and the communication speed measurement unit;
a received data storage unit that temporarily stores data transmitted from the portable terminal; and
an image memory,
wherein the communication control unit is configured to:
further perform the control associated with communication disruption including (1) saving, at the same time as the transmission of the warning message, the data temporarily stored in the received data storage unit in the image memory, and (2) storing, upon receipt of the data transmitted from the portable terminal when the communication is reconnected after the disruption of the communication, the data in the received data storage unit as data following the data received before the transmission of the warning message;
increase the first radio wave intensity by a predetermined value each time the communication characteristics become worse than predetermined reference characteristics, thereby correcting the first radio wave intensity; and
transmit an instruction signal for starting communication to the portable terminal when the radio wave intensity measured by the radio wave intensity measurement unit exceeds the first radio wave intensity after the disruption of the communication.

* * * * *